United States Patent Office 3,519,220
Patented July 7, 1970

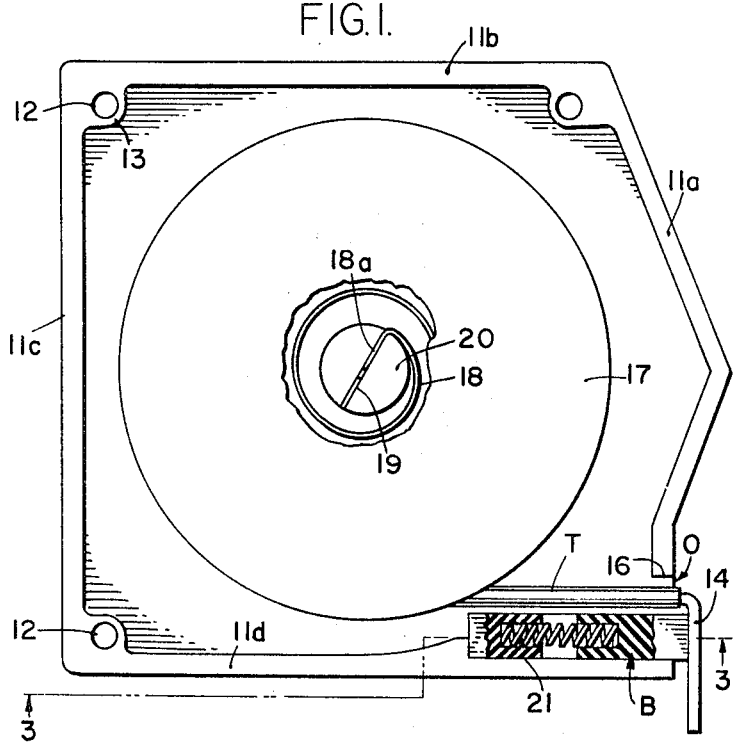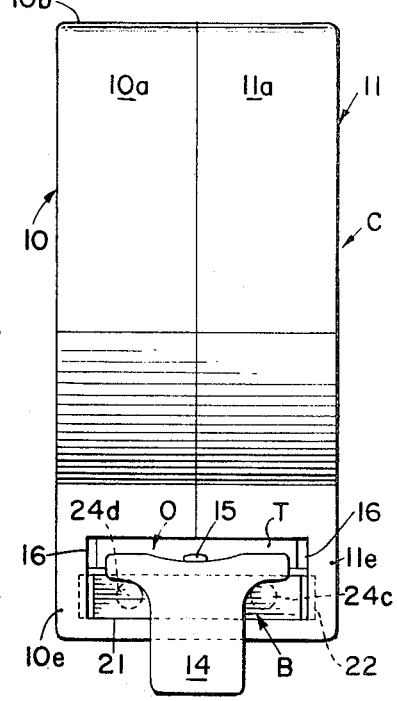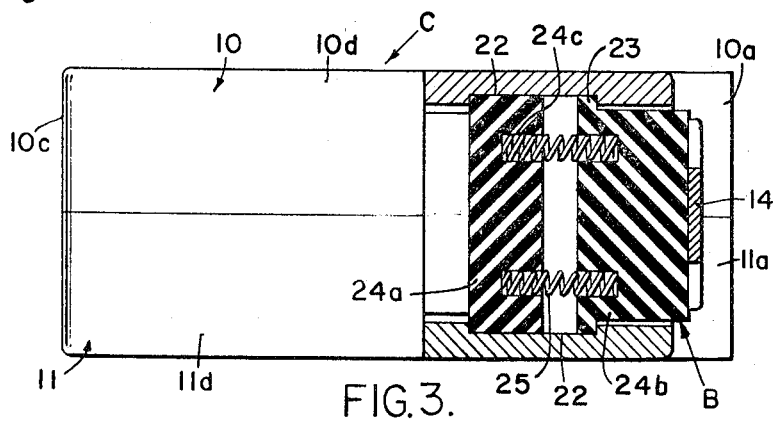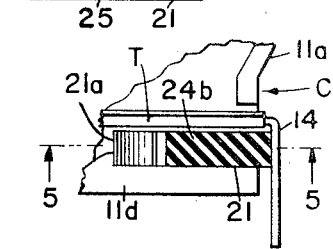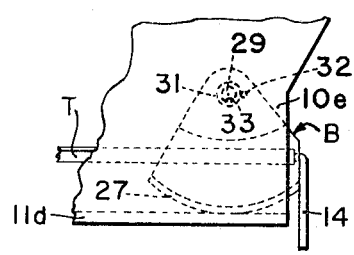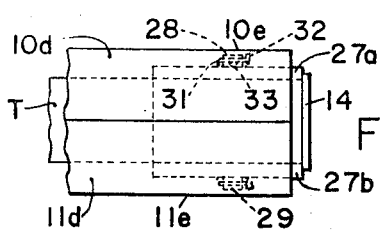
INVENTOR
CHARLES ZELNICK
BY- *His Attorneys,*
*Learman, Learman & McCulloch*

3,519,220
TAPE MEASURE CONSTRUCTION INCORPORATING A SPRING MAINTAINED TAPE HOOK BUMPER
Charles Zelnick, Apex, N.C., assignor to Cooper Industries, Inc., Houston, Tex., a corporation of Ohio
Filed Aug. 22, 1968, Ser. No. 754,620
Int. Cl. B65h 75/48
U.S. Cl. 242—107.2         10 Claims

ABSTRACT OF THE DISCLOSURE

A tape measure construction comprising a tape casing formed of a pair of mating sections having aligned slots forming a frontal tape opening therein; a tapeline coiled in the casing and having a free end, with a tape hook thereon, extending out the opening; a resilient bumper mounted for forward and rearward movement adjacent the tape opening in the casing; and spring means maintaining the bumper projecting from the casing in position to be engaged by the tape hook on the end of the tapeline before the tape hook can engage the measuring tape casing.

---

It is recognized that the stress-wound return springs utilized in contemporary automatic return tape measures have considerable torque and one of the problems encountered in using such tape measures is the gradual destruction of the leading end of the tapeline by the constant hammering it receives as it is retrieved into the casing. Many users of such tape measures do not properly manipulate the tape return button which permits them to control the speed of return of the tape to the casing, or have no interest in doing so, with the result that the button is held in the depressed condition so that the entire tape is returned to the casing at full speed and the tape hook slams into the casing under the force of the full torque produced by the return spring. The hook will quite often bend under this impact. However, more importantly, the shear load applied to the hook rivet will tend to tear the rivet loose. When a sudden stress is applied to such relatively thin tape rules at the rivet holes, there is also a tendency for the tapeline to split in the rivet area.

A prime object of the instant invention is to provide a measuring tape with a spring-maintained bumper mounted in position to absorb a great percentage of the impact load of the tape hook when it returns at full speed and cushion the shock so that the tape hook and tapeline are not destroyed in a relatively short time.

Still a further object of the invention is to provide a highly reliable tape measure of the character described which can be economically produced and yet is of durable construction.

Other objects and advantages of the invention will be pointed out specifically or will become apparent from the following description when it is considered in conjunction with the appended claims and the accompanying drawings, in which:

FIG. 1 is a side elevational view of the tape measure with one of the side sections removed to expose the interior thereof, the bumper of, the bumper plate or carriage plate being shown partly in section to expose the spring which maintains it in position;

FIG. 2 is a front elevational view;

FIG. 3 is an inverse, sectional plan view taken on the line 3—3 of FIG. 1;

FIG. 4 is a fragmentary, side elevational view illustrating a slightly modified form of the invention;

FIG. 5 is a fragmentary, inverse plan view similar to FIG. 3 and illustrating still a further embodiment of the invention, the view being taken on the line 5—5 of FIG. 6;

FIG. 6 is a fragmentary, side elevational view of the embodiment shown in FIG. 5.

FIG. 7 is a fragmentary, side elevational view illustrating still a further embodiment of the invention; and FIG. 8 is a fragmentary, inverse plan view thereof.

Referring now more particularly to the accompanying drawings, wherein a preferred embodiment of the invention only is shown, the numerals 10 and 11 generally indicate preferably die cast tape casing side sections which, respectively, include front walls 10a and 11a, top walls 10b and 11b, rear walls 10c and 11c, bottom walls 10d and 11d, and side walls 10e and 11e. Threaded openings 12 may be provided in enlarged portions 13 provided on the casing section 11, and screws (not shown) may be utilized in the usual manner to extend through openings in the casing section 10 into the openings 12 to secure the casing sections 10 and 11 in mated illustration.

A tapeline generally designated T and having a tape hook 14 riveted thereto, as at 15, in the usual manner, may be withdrawn from the tape casing generally designated C through a tape opening O formed by communicating and aligned slots 16 provided in each casing section front wall 10a and 11a. The tapeline T is wound on a tape drum 17 which is powered by the usual return spring 18, and the inner end 18a of spring 18 is received in a slot 19 provided in the tape casing center post 20 in the usual manner and thus anchors the spring 18, and accordingly the tapeline T to which its opposite end is attached, within the casing C. It will be observed that the tape hook 14 is less in width than the frontal tape opening O provided in the casing section front walls 10a and 11a.

Formed in the ramp portion of the lower walls 10d and 11d of the casing sections 10 and 11 in alignment with the opening O is a bumper-receiving recess 21 (see FIG. 1) which extends from the side wall 10e to the side wall 11e. In fact, the side walls 10e and 11e are also recessed as at 22 (see FIG. 3) to accommodate a rear shouldered portion 23 of the bumper means or plate generally designated B. As shown, the bumper B in the embodiment of the invention illustrated in FIGS. 1–3 includes a pair of spaced apart resilient rubber pads or plates 24a and 24b which have coil spring receiving blind bores 24c and 24d, respectively, for receiving coil springs 25 which normally maintain the element 24b in a position in which its front end extends forwardly beyond the portions of the front walls 10a and 11a in which the opening O is provided.

To assemble the bumper element B in the casing C is a relatively easy task which does not add to the cost of manufacturing the tape measure in a material way. With the casing sections 10 and 11 apart, the bumper elements 24a and 24b are inserted into one of the recesses 21 and then the other casing section is fitted to it, with the bumper elements being receiving in the identical and horizontally aligned slot 21.

In operation, when the tapeline T has been extended from the casing C and the spring return button is pressed to withdraw it into the casing C through the opening O, the hook 14 is prevented from engaging the casing C by the bumper B. The bumper B absorbs the impact of the returning tapeline and does not transmit the shock to the extent there is any tedency to inadvertently drop the tape measure or to harm the measuring tape in any way.

In FIG. 4 I have demonstrated a slightly modified embodiment of the invention in which identical parts have been identified by the same numerals and letters. In this embodiment of the invention the rear pad portion 24a of the bumper B is omitted and the spring seat bores 24c are provided in the lower wall portions 10d and 11d. Except for this difference, the embodiment of the invention illustrated in FIG. 4 is identical with the embodiment of the invention illustrated in FIGS. 1–3.

In FIGS. 5 and 6 an embodiment of the invention similar to FIG. 4 is illustrated in which, however, the coil springs 25 are replaced by a U-shaped leaf spring 26 which bears against the shoulder wall 21a of the recess 21 and maintains the bumper member B in forwardly projecting position, as previously. Except for this, the tape measure is identical with the one previously described.

In FIGS. 7 and 8 the tape measure is identical except for the bumper portion B, which assumes the form of a resilient rubber segment having a curvilinear lower wall 27 joined by side walls 27a and 27b. The tapeline T extends freely between the side walls 27a and 27b as shown. Openings 28 are provided in the side walls 10e and 11e of the casing to receive a shaft 29 which is fixed to the segment B. A torsion spring generally designated 31 is connected between an opening 32 in the one side wall 10e and an opening 33 in shaft 29 and functions to maintain the segment B in the forward position in which it is shown in FIGS. 7 and 8. When the tapeline T has been extended from the casing C and the spring return button is pressed to withdraw it into the casing C through the opening O, the hook 14 is prevented from engaging the casing C by the bumper B which can swing inwardly about the shaft 29. The torsion spring 31, however, absorbs the impact of the returning tapeline and the shock which would otherwise be transmitted to the casing C.

In each of the embodiments illustrated, the bumper element B is formed of a rubber of suitable durometer which in itself has resilience.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

I claim:

1. In a measuring tape construction: a casing having a frontal tape opening therein; a tapeline coiled in said casing and having a leading end extending out said opening; a tape hook on said end extending downwardly to prevent said end from being drawn fully into said casing; motor means within said casing operable for withdrawing said tapeline into said casing except for said tape hook; bumper means mounted by said casing in the path of said tape hook for fore and aft movement as a body below the path of the tapeline from a first position at said tape opening to a retracted position; and spring means, within said casing behind said tape opening, normally maintaining said bumper means in said first position to engage said hook and prevent it from slamming against said casing when the motor means is operating to retract said tapeline.

2. The combination defined in claim 1 in which said casing has side sections comprising shells with mating front, and rear, lower and upper edge wall portions joined to side wall portions; and recess means comprising communicating slots formed in the lower wall portion of each shell is provided to receive said bumper means.

3. The combination defined in claim 1 in which said bumper means comprises a bumper plate with a coil spring seating recess in its rear end wall; and said spring means comprises a coil spring therein.

4. The combination defined in claim 1 in which said bumper means comprises a pair of spaced apart bumper plates with aligned coil spring recesses in the respective rear and front end walls thereof.

5. The combination defined in claim 1 in which said bumper means comprises a bumper plate and said spring means comprises a leaf spring disposed between the plate and casing means.

6. The combination defined in claim 1 in which said bumper means comprises a bumper plate; means pivotally mounting said plate for front-to-rear swinging movement; and said spring means comprises torsion spring means.

7. The combination defined in claim 2 in which said slots extend beyond said lower wall portions and into the side wall portions of each shell and said side wall portions have shoulders; enlarged rear portions of said bumper means being accommodated in said slots in the side wall portions so that said shoulders prevent said bumper means from being withdrawn frontally from said casing.

8. In a measuring tape construction: a casing having a frontal tape opening therein; a tape line coiled in said casing and having a leading end extending out said opening; a retaining tape hook on said end extending angularly to prevent said end from being drawn fully into said casing; motor means within said casing operable for withdrawing the leading end of said tapeline in a path through said opening into said casing, except for said tape hook; bumper means in superposed disposition with the path of said tapeline mounted by said casing for fore and aft bodily movement in the path of said tape hook from a first position at said tape opening to a retracted position; and resilient means within said casing maintaining said bumper means in said first position to engage said hook and prevent it from slamming against said casing when the motor means is operating to retract said tapeline.

9. The combination defined in claim 8 in which said bumper means is generally parallel to said tape opening and of greater width than said tape hook.

10. The combination defined in claim 8 in which said bumper means comprises a resilient pad.

References Cited

UNITED STATES PATENTS

| | | | |
|---|---|---|---|
| 1,975,419 | 10/1934 | Grube | 242—107.2 XR |
| 2,599,320 | 6/1952 | Dart | 242—107.3 |
| 2,616,635 | 11/1954 | Carlson | 242—107.2 |
| 3,041,004 | 6/1962 | Busch | 242—107.3 |
| 3,042,338 | 7/1962 | Ljungberg | 242—107.2 |

FOREIGN PATENTS 739,657   8/1966   Canada.

STANLEY N. GILREATH, Primary Examiner

W. H. SCHROEDER, Assistant Examiner